United States Patent [19]  [11] 4,108,677
Valiga  [45] Aug. 22, 1978

[54] PROCESS FOR TREATING WASTE SLUDGE FROM COMBUSTION PLANT DESULFURIZATION UNITS AND CEMENTITIOUS PRODUCT OF THE PROCESS

[76] Inventor: Richard E. Valiga, 1927 Queen's Wood Dr., York, Pa. 17403

[21] Appl. No.: 744,510

[22] Filed: Nov. 24, 1976

Related U.S. Application Data

[63] Continuation-in-part of Ser. No. 610,269, Sep. 4, 1975, abandoned.

[51] Int. Cl.² .............................................. C04B 11/00
[52] U.S. Cl. .................................... 106/109; 106/110; 423/242; 423/555; 61/35
[58] Field of Search ................. 106/109, 110; 423/161, 423/166, 170, 171, 242, 243, 244, 554, 555, 558; 61/35

[56] References Cited

U.S. PATENT DOCUMENTS

| | | | |
|---|---|---|---|
| 2,090,142 | 8/1937 | Nonhebel et al. | 423/242 |
| 3,855,391 | 12/1974 | Selmeczi et al. | 423/242 |
| 3,920,795 | 11/1975 | Selmeczi et al. | 423/242 |

FOREIGN PATENT DOCUMENTS 396,969 8/1933 Fed. Rep. of Germany.

OTHER PUBLICATIONS

"The Merck Index", 8th ed., 1968, p. 196.
"Handbook of Chemistry and Physics", The Chemical Rubber Co., 46th edition, p. B-164.

Primary Examiner—R. Dean
Assistant Examiner—John P. Sheehan

[57] ABSTRACT

Aqueous alkaline desulfurization treating units for combustion gases generate as a product an aqueous sludge containing sulfur compounds of calcium. Many such sludge products contain more than 30 percent by weight (of the solids) of calcium sulfite hemihydrate. These waste products are in part calcined at a temperature from 250°C to 650°C to produce a moisture-free, cementitious product which is thereafter recombined with uncalcined aqueous sludge to produce a cementitious product which can be profitably utilized or which may be conveniently discarded as a landfill. If desired, fly ash or bottom ash produced in the combustion process can be combined with the cementitious product.

7 Claims, No Drawings

PROCESS FOR TREATING WASTE SLUDGE FROM COMBUSTION PLANT DESULFURIZATION UNITS AND CEMENTITIOUS PRODUCT OF THE PROCESS

CROSS-REFERENCES TO RELATED APPLICATIONS

This application is a continuation-in-part of my copending application, Ser. No. 610,269 filed Sept. 4, 1975, and now abandoned.

BACKGROUND OF THE INVENTION

1. Field of the Invention

The invention relates to a process for producing a product from an aqueous slurry waste product which is produced in aqueous alkaline sulfur removal process equipment associated with combustion apparatus or other sources of sulfur oxide and to the product of the process.

2. Description of the Prior Art

In U.S. Pat. No. 3,855,391 a process is described for stabilizing aqueous alkaline scrubber waste products. These scrubber waste products normally contain as essential ingredients calcium sulfate dihydrate and calcium sulfite hemihydrate. The patent proposes addition of metal oxide catalysts to the scrubbing equipment to promote the oxidation of the calcium sulfite hemihydrate to the calcium sulfate dihydrate. The resulting sludge, with optimized calcium sulfate, as described in the patent, is separated into two portions. A first portion is calcined at temperatures of 260°–360° F to convert the calcium sulfate dihydrate into calcium sulfate hemihydrate, also known as plaster of Paris. The calcined first portion is recombined with the second portion to convert the calcium sulfate hemihydrate back to calcium sulfate dihydrate and the resulting mixture is thereafter dewatered and sent to a landfill area as a sludge which assertedly stabilizes itself.

One shortcoming of the process is the requirement for oxidizing the sludge in the scrubber. The oxidized sludge creates plugging and clogging difficulties within the scrubber. It would be desirable to create a process for stabilizing aqueous alkaline sludges which does not require the in-scrubber oxidation of the sludge solids, i.e., a process which can utilize the scrubber waste products as received. Such scrubber waste products normally contain at least 30 weight percent calcium sulfite hemihydrate (based on solids).

SUMMARY OF THE INVENTION

According to the present invention, the aqueous sludge which is developed in an aqueous alkaline desulfurization unit associated with a combustion plant can be stabilized to facilitate its disposal or to produce a useful commercial product by calcining a first portion of the sludge at a temperature between 250° and 650° C in order to eliminate volatile liquids and to convert the calcium sulfur compounds in the sludge into useful cementitious materials. In the present process there is no need to carry on the oxidation of the sludge in the scrubber with metal oxide catalysts.

The calcium sulfite hemihydrate itself becomes a cementitious material, anhydrous calcium sulfite, when heated to temperatures of 250°–350° C. The calcium sulfate dihydrate converts to calcium sulfate hemihydrate at temperatures below 200° C. The calcium sulfate hemihydrate converts to calcium sulfate soluble anhydrite at a temperature from 210°–280° C. The calcium sulfate soluble anhydrite converts to calcium sulfate anhydrite at temperatures from 550° to 650° C. When the calcining step is carried out at temperatures of 275°–350° C, the resulting calcined intermediate product contains more anhydrous calcium sulfite than calcium sulfate hemihydrate.

The anhydrous calcium sulfite is a cementitious material as is the calcium sulfate soluble anhydrite and the calcium sulfate anhydrite.

A typical lime scrubbing sludge has the following solids composition by weight:
- 73% calcium sulfite hemihydrate
- 11% calcium sulfate dihydrate
- 11% calcium hydroxide
- 5% calcium carbonate A typical limestone scrubbing sludge has the following solids composition by weight:
- 58% calcium sulfite hemihydrate
- 9% calcium sulfate dihydrate
- 33% calcium carbonate Both sludges contain predominantly calcium sulfite hemihydrate which can be readily converted to anhydrous calcium sulfite at temperatures of 250°–350° C.

In accordance with this invention the aqueous sludge is initially dewatered in a thickener. The desulfurization sludges normally contain from 10 to 15 percent by weight solids. The primary dewatering of the slurry in a conventional thickener increases the concentration of the slurry to about 25–35% solids. If desired, secondary dewatering may be carried out to increase the solids concentration up to 50–70% solids.

A first portion of the dewatered sludge is calcined at temperatures of 210°–650° C and recombined with the remainder of the sludge to produce the stabilized mixture for use as a landfill. If desired, fly ash or bottom ash may also be incorporated into the admixture for convenient disposal. The first portion contains from 1 to 90 weight percent of the sludge solids depending upon the ultimate objective of the process. The second portion correspondingly may constitute from 10 to 99 weight percent of thickened sludge solids.

EXPERIMENTS

Sludge I was obtained from an electrical utility station and had the following solids composition by weight:
- calcium sulfate dihydrate - 25–35%
- calcium sulfite hemihydrate - 35–45%
- calcium carbonate - 10–30%
- fly ash - 5–15%

The total solids in the aqueous sludge sample was 35–40% by weight.

A sludge II was obtained from an industrial lead smelter and had the following solids composition by weight:
- calcium sulfate dihydrate - 20–25%
- calcium sulfite hemihydrate - 75–80%
- lead - 1.2–2%

The total solids in the aqueous sludge sample was 30–35% by weight.

700 grams of sludge I was heated to 280° C. 290 grams of calcined sludge remained. This calcined material is identified as I-A.

700 grams of sludge I was heated to 650° C and produced 286 grams of calcined material identified as I-B.

600 grams of sludge II was heated to 280° C. A total of 250 grams of calcined product remained identified as material II-A.

600 grams of sludge II was heated to 650° C to produce 189 grams of calcined material identified as material II-B.

600 grams of sludge II was heated to 350° C. 211 grams of calcined product remained identified as material II-C.

A synthetic sludge III was prepared as described in U.S. Pat. No. 3,785,840, i.e., by bubbling sulfur dioxide through lime-water to generate calcium sulfite. The pH of the resulting synthetic sludge was 7.3, corresponding to complete conversion of the hydroxide to sulfite.

The dried sludge solids were heated gradually to 450° C. Samples of the sludge solids were withdrawn during the heating process as follows:

| SAMPLE | WITHDRAWN AT |
|---|---|
| III A | 250° C |
| III B | 300° C |
| III C | 350° C |
| III D | 400° C |
| III E | 450° C |

The calcined materials were recombined with uncalcined sludges; with fly ash; with uncalcined sludges and fly ash; and with water to produce mixtures which were formed into test cylinders in a Carver press. The test cylinders had a diameter of 1⅜ inch in all cases. The test cylinders were prepared, sealed in airtight plastic containers and stored at room temperature for one day and for three days in each instance. The test cylinders were compressed without confinement in order to determine the unconfined compressive strength of the materials. The results of the tests are set forth in the following table.

Each compressive strength is the average of two actual tests.

| Test | Calcined Sludge Wt % | Calcined Sludge Type | Uncalcined Sludge Wt % | Uncalcined Sludge Type | Added FLYASH Wt % | Unconfined Compression* 1-day | Unconfined Compression* 3-days |
|---|---|---|---|---|---|---|---|
| 1 | 1 | IA | 99 | I | 0 | — | 0.78 |
| 2 | 5 | IA | 95 | I | 0 | — | 5.8 |
| 3 | 10 | IA | 90 | I | 0 | 2.2 | 9.5 |
| 4 | 20 | IA | 80 | I | 0 | 19.8 | 30.2 |
| 5 | 30 | IA | 70 | I | 0 | 29.3 | 31.5 |
| 6 | 10 | IIA | 90 | II | 0 | 1.1 | 2.2 |
| 7 | 20 | IIA | 80 | II | 0 | 2.3 | 3.6 |
| 8 | 20 | IA | 70 | I | 10 | 9.9 | 10.8 |
| 9 | 20 | IA | 60 | I | 20 | 13.3 | 14.6 |
| 10 | 0 | — | 100 | I | 0 | 0 | 0 |
| 11 | 0 | — | 100 | II | 0 | 0 | 0 |
| 12 | 1 | IB | 99 | I | 0 | — | 2.1 |
| 13 | 5 | IB | 95 | I | 0 | — | 7.3 |
| 14 | 10 | IB | 90 | I | 0 | 4.3 | 14.8 |
| 15 | 20 | IB | 80 | I | 0 | 18.7 | 49.7 |
| 16 | 30 | IB | 70 | I | 0 | 32.4 | 82.8 |
| 17 | 10 | IIB | 90 | II | 0 | 2.2 | 4.3 |
| 18 | 20 | IIB | 80 | II | 0 | 5.7 | 8.6 |
| 19 | 20 | IB | 70 | I | 10 | 9.9 | 31.5 |
| 20 | 20 | IB | 60 | I | 20 | 16.2 | 32.4 |
| 21 | 10 | IIC | 90 | II | 0 | 4.3 | 4.3 |
| 22 | 20 | IIC | 80 | II | 0 | 20.5 | 27.4 |
| 23 | 30 | IIC | 70 | II | 0 | 27.1 | 56.6 |
| 24 | 75 | IIIA | 25 | I | 0 | — | 0 |
| 25 | 75 | IIIB | 25 | I | 0 | — | 9.54 |
| 26 | 75 | IIIC | 25 | I | 0 | — | 102.6 |
| 27 | 75 | IIID | 25 | I | 0 | — | 100.8 |
| 28 | 75 | IIIE | 25 | I | 0 | — | 100.8 |

*Measured in Kips per square foot

From inspection of the table it will appear that the calcined sludge can be combined with the uncalcined sludge to produce a mixture which develops compressive strength at one day and which increases over a period from one to three days. Inasmuch as all of the calcined sludges in the foregoing table were heated above 210° C, the calcium sulfate hemihydrate content should have been reduced to zero. Thus the sludges include, as active cementitious ingredients, anhydrous calcium sulfite, soluble calcium sulfate anhydrite and calcium sulfate anhydrite.

It will further be observed that the sludges can be combined with fly ash to produce useful mixtures which will stabilize readily.

Note that sludges I and II do not develop hardening (tests 10, 11). Addition of as little as 1 percent of the heat treated sludge IA to the untreated sludge I achieved measurable and useful hardness (tests 1, 12). Addition of larger quantities of the heat treated sludge IA significantly increased the hardness of the resulting mixture (tests 2, 3, 4, 5). Including inert ingredients such as fly ash in the mixture (tests 8, 9) also achieved useful hardening.

The other sludge II exhibits the same general hardening characteristics when heat treated. The simulated sludge III likewise exhibits the same general hardening characteristics when heat treated.

I claim:

1. A method for hardening inorganic aqueous waste sludge which comprises as its non-aqueous ingredient calcium salts selected from the class consisting of calcium sulfate and calcium sulfite and wherein at least 30 percent by weight of the solids are calcium sulfite hemihydrate, including the steps of:
   (1) thickening the said sludge by removing at least a portion of the liquid content;
   (2) withdrawing a first portion of the thickened sludge, removing volatile liquids from the said first portion and calcining the residual solids from said first portion at 250° to 650° C to produce a dry, calcined intermediate product which comprises essentially dry, cementitious ingredients selected from the class consisting of calcium sulfate soluble anhydrite, calcium sulfate anhydrite and anhydrous calcium sulfite;
   (3) withdrawing a second portion of the thickened sludge, and
   (4) mixing the said partially dewatered sludge and at least a portion of the said intermediate product to produce a hardenable product.

2. The method of claim 1 wherein the said first portion constitutes 1 to 90 weight percent of the thickened sludge solids and the said second portion constitutes from 10 to 99 weight percent of the thickened sludge solids.

3. The method of claim 1 wherein inert particulate aggregates are added to the said hardenable sludge.

4. The method of claim 3 wherein the said aggregates comprise fly ash.

5. The method of claim 3 wherein the said aggregates comprise bottom ash.

6. A hardened solidified product of the process of claim 1.

7. The process of claim 1 wherein the said calcining step is at temperatures from 250° to 350° C and the said calcined intermediate product includes more anhydrous calcium sulfite than calcium sulfite hemihydrate.

* * * * *